Patented Dec. 5, 1950

2,532,392

UNITED STATES PATENT OFFICE 2,532,392

ADDITION PRODUCTS OF SULFURIC ACID AND POLYCARBOXYLIC TERTIARY AMINO ACIDS

Frederick C. Bersworth, Verona, N. J.

No Drawing. Application October 4, 1947,
Serial No. 778,046

9 Claims. (Cl. 260—534)

1

This invention relates to addition products of sulfuric acid and polycarboxylic tertiary amino acids. It is a continuation-in-part of my copending application Serial No. 491,670 filed June 21, 1943, issued on October 7, 1947 as U. S. Patent No. 2,428,353.

These addition products, as pointed out in said copending application, are of particular value in the formation of esters of said tertiary-amino acids, which esters and their preparation are claimed in that application. They are also useful for other purposes, such as in forming anhydrides, and as intermediate products in the formation of other compounds.

The preparation of addition products of primary and of secondary amino acids has already been described in the literature. These amino acids have respectively two and one hydrogen atoms attached directly to each amino nitrogen atom, and are relatively much more basic than tertiary amino acids, in which there are no hydrogen atoms attached directly to the amino nitrogen atoms. The addition of relatively strong mineral acids to primary amino acids has been found to take place fairly readily, due to the basicity of the latter. The addition of such mineral acids to secondary amino acids has been found to proceed with greater difficulty, due to the lesser basicity of the secondary amino nitrogens. On the other hand, the addition of such mineral acids to tertiary amino compounds having a plurality of carboxylic acid groups in the molecule, and being strongly acidic in character, has, as far as I am aware, been considered impossible, due among other things to the relative acidity of such tertiary amino acids. In fact, such tertiary amino acids which are amenable to the procedure of this invention have pH values in the order of pH=2.

It is therefore an object of this invention to prepare addition compounds of sulfuric acid and polycarboxylic tertiary amino acids. Another object is to prepare these addition compounds in an economical and practical manner, with good yields and relatively little formation of undesirable by-products. Other objects will be apparent from the following disclosure.

In carrying out the procedure of this invention, strong sulfuric acid is added to the polycarboxylic tertiary amino acid, in an amount such that there will be at least 1.1 hydrogen atom of the sulfuric acid present per tertiary amino nitrogen atom. A considerable excess of sulfuric acid over this proportion (e. g. twice as much) may be used. Much larger amounts are wasteful, and may lead to undesirable side reactions under some conditions of preparation, while smaller amounts than the minimum mentioned above result in poor or erratic yields. The pH value of the sulfuric acid should be distinctly in excess of that of the polycarboxylic tertiary amino acid to which it is added, e. g. the former should be at least pH=1,

2 or preferably pH=0 or even less, when the pH of the amino acid is about 2. And yet, surprisingly enough, the amino acids amenable to the procedure of this invention are not decomposed or otherwise deleteriously affected by such strong mineral acid treatment. Further details of the conditions of reaction for proper results will appear hereinafter.

The polycarboxylic tertiary amino acids with which this invention is concerned may be made, for example, in accordance with my U. S. Patent No. 2,407,645. They are, more specifically, N-polyacetic acids of alkylene (or polyalkylene) amines (or polyamines), wherein each nitrogen atom is bonded to one alkylene group and to two acetic acid groups, —$CH_2$—COOH (or to two of the former and one of the latter), and to no other groups or atoms. That is, each nitrogen atom is a tertiary nitrogen atom. Examples of these polycarboxylic tertiary amino acids, which are useful in carrying out the procedure of this invention to produce the addition products herein described and claimed, are the N,N'-tetraacetic acids of ethylene diamine, propylene 1,2-diamine, propylene 1,3 diamine, tetramethylene 1,4-diamine, and hexamethylene 1,6-diamine; the N,N',N''-pentaacetic acids of diethylene triamine and dipropylene 1,2-triamine; triethylene tetramine N,N',N'',N''' hexaacetic acid, and higher homologues thereof; ethyl amine N-diacetic acid, normal $\alpha$-butyl amine N-diacetic acid and other alkyl monoamine N-diacetic acids including those of the higher alkyl amines such as lauryl and stearyl, and cyclohexyl amine N-diacetic acid. It will be noted that in all these compounds, the nitrogen atoms all occur in the configuration >CH—N($CH_2$COOH)$_2$ except that the nitrogen atoms intermediate a hydrocarbon chain occur in the configuration

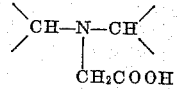

In carrying out the process of this invention, there must be used, as already indicated, sufficient sulfuric acid to provide at least 1.1 atoms of acid hydrogen (of the sulfuric acid) per atom of amino nitrogen in the amino acid. Thus, per mol of mono amino acid, at least 0.55 mol of sulfuric acid are used; per mol of diamino acid, at least 1.1 mols of sulfuric acid; per mol of triamino acid, at least 1.65 mols of sulfuric acid; and so on. In actual practice, an excess of sulfuric acid over these amounts is preferred, in order to insure completion of the reaction and avoidance of any appreciable amounts of unreacted ingredients. Thus, a convenient working point is in the order of about 50% excess over theoretical, e. g. about 1.5 mols sulfuric acid per mol of diamino polycarboxylic acid. But even if considerable excesses of sulfuric acid are used, the final addition products, on analysis, are found to contain between about 1.1 and 2 mols of sulfuric acid per mol of diamino polycarboxylic acid (or per two mols of monoamino carboxylic acid, or per two-thirds mol of triamino carboxylic acid, etc.). These addition products are homogeneous compounds and are in the form of dry, or substantially dry, white crystalline powders, except that those of the higher alkyl monoamines such as lauryl and stearyl are rather of a soap-like feel and flaky nature than powdery.

The preparation of the addition product may be carried out by either a "wet" or a "dry" process.

In the wet process, the sulfuric acid is added to the amino acid, in an amount within the range already set forth, and in such concentration to give a pH value of preferably about zero, or even less, to the resulting mixture. The sulfuric acid should therefore be added in aqueous solution of at least 1 N strength; and preferably higher, e. g. 4 N. The mixture is heated, preferably to incipient or actual boiling—and preferably with refluxing if boiling takes place—while the reaction to form the addition product proceeds. Upon subsequent cooling, the addition product proceeds. Upon subsequent cooling, the addition product crystallizes out, and may be removed as by filtration, and then dried if desired.

For example, take 2 mols concentrated (96%) $H_2SO_4$ in 1000 cc. water (i. e. about 4 N), and mix in one mol (292 g.) ethylene diamine N,N'-tetraacetic acid; heat, with stirring, to incipient boiling, which produces a clear solution. Then allow this solution to cool, whereupon crystals of the desired addition product form. As the solubility gradient with temperature is steep, the colder the solution the better the yield. The crystals are filtered off and sucked as dry as possible. They are very clean, and filter well; washing is unnecessary and in fact is undesirable, as the addition product is water-soluble and is easily hydrolyzed. Hydrolysis may be employed for purposes of analysis in determining the amounts of sulfuric acid and amino acid in the product; these are found to be in the ratio of substantially 1.5 mols to 1 mol.

The same procedure may be followed, with like results, for the other diamino tetraacetic acids referred to above, e. g. those of propylene 1,2-diamine, hexamethylene diamine, etc. For the monoamino diacetic acids, the ratio of sulfuric acid employed to amino acid is conveniently about one half that of the foregoing example (e. g. follow that example but use 2 mols n-a butyl amine diacetic acid. For the triamino pentaacetic acids, the amount of sulfuric acid per mol of amino acid should be correspondingly increased,- e. g. follow the foregoing example but use 2.5 mols $H_2SO_4$ in 1250 cc. water with one mol diethylene triamine pentaacetic acid.

In the dry process, the dry crystalline amino acid is treated with substantially anhydrous (e. g. 96%) $H_2SO_4$, in the proper quantities; with thorough stirring, the amino acid takes up the liquid $H_2SO_4$ to form a substantially dry crystalline powder. This procedure avoids the presence of extra water and the necessity for filtration and drying. On the other hand, the mixing must be given more attention to assure that the resulting addition product is homogeneous.

For example, use one mol of dry crystalline anhydrous diamino tetraacetic acid to between 1.1 and 2 mols of sulfuric acid; or one mol of the dry anhydrous monoamino diacetic acid to between 0.55 and one mol of sulfuric acid; or one mol of the dry anhydrous triamino tetraacetic acid to between 1.65 and 2.5 mols sulfuric acid; and so on for higher homologues.

More sulfuric acid may be used, if desired, in this dry process, but any substantial excess above that indicated will result in a moist or sloppy product, due to the presence of uncombined sulfuric acid.

I claim:

1. An addition product consisting of a polycarboxylic tertiary amino acid and sulfuric acid, in the ratio of at least 0.55 molecules of sulfuric acid per nitrogen atom of said amino acid.

2. An addition product consisting of a tetracarboxylic tertiary diamino acid and sulfuric acid, in the ratio of at least 1.1 mol of sulfuric acid per mol of said diamino acid.

3. An addition product consisting of sulfuric acid and ethylene diamine N,N'-tetraacetic acid, in the ratio of at least 1.1 mol of sulfuric acid per mol of said diamino acid.

4. An addition product consisting of sulfuric acid and propylene 1,2-diamine N,N'-tetraacetic acid, in the ratio of at least 1.1 mol of sulfuric acid per mol of said diamino acid.

5. An addition product consisting of sulfuric acid and a dicarboxylic tertiary mono amino acid, in the ratio of 0.55 mol of sulfuric acid per mol of said amino acid.

6. An addition product consisting of sulfuric acid and a pentacarboxylic tertiary triamino acid, in the ratio of at least 1.65 mols of sulfuric acid per mol of said triamino acid.

7. An addition product consisting of sulfuric acid and diethylene triamine pentaacetic acid, in the ratio of at least 1.65 mols of sulfuric acid per mol of said triamino acid.

8. The method of preparing an addition product of a polycarboxylic tertiary amino acid and sulfuric acid, which comprises heating together a mixture of said amino acid and sulfuric acid in the ratio of at least 0.55 molecule of sulfuric acid per nitrogen atom of said amino acid; cooling the heated mixture, and removing the resulting crystals of addition product of said two acids.

9. The method of preparing an addition product which comprises heating together to substantially the boiling point a solution of at least 1 N sulfuric acid and ethylene diamine N,N'-tetraacetic acid, in the ratio of at least 1.1 mol sulfuric acid per mol of said amino acid, cooling the resulting solution, and removing therefrom the resulting crystals of the addition product of said two acids.

FREDERICK C. BERSWORTH.

REFERENCES CITED

The following references are of record in the file of this patent:

UNITED STATES PATENTS

| Number | Name | Date |
|---|---|---|
| 2,168,181 | Ulrich et al. | Aug. 1, 1939 |
| 2,413,968 | Hallowell | Jan. 7, 1947 |
| 2,428,353 | Bersworth | Oct. 7, 1947 |

FOREIGN PATENTS

| Number | Country | Date |
|---|---|---|
| 638,071 | Germany | Nov. 9, 1936 |

OTHER REFERENCES

Heintz: Liebig's Annalen, vol. 136, pp. 216, 219 (1865).

Heintz etc., Beilstein (4th ed.), vol. 4, pp. 366, 370 (1922).